Dec. 23, 1969         E. E. HOWE         3,485,517
PRESSURE FITTING FOR PIPES CARRYING GASEOUS FLUIDS
Filed May 8, 1968         2 Sheets-Sheet 1
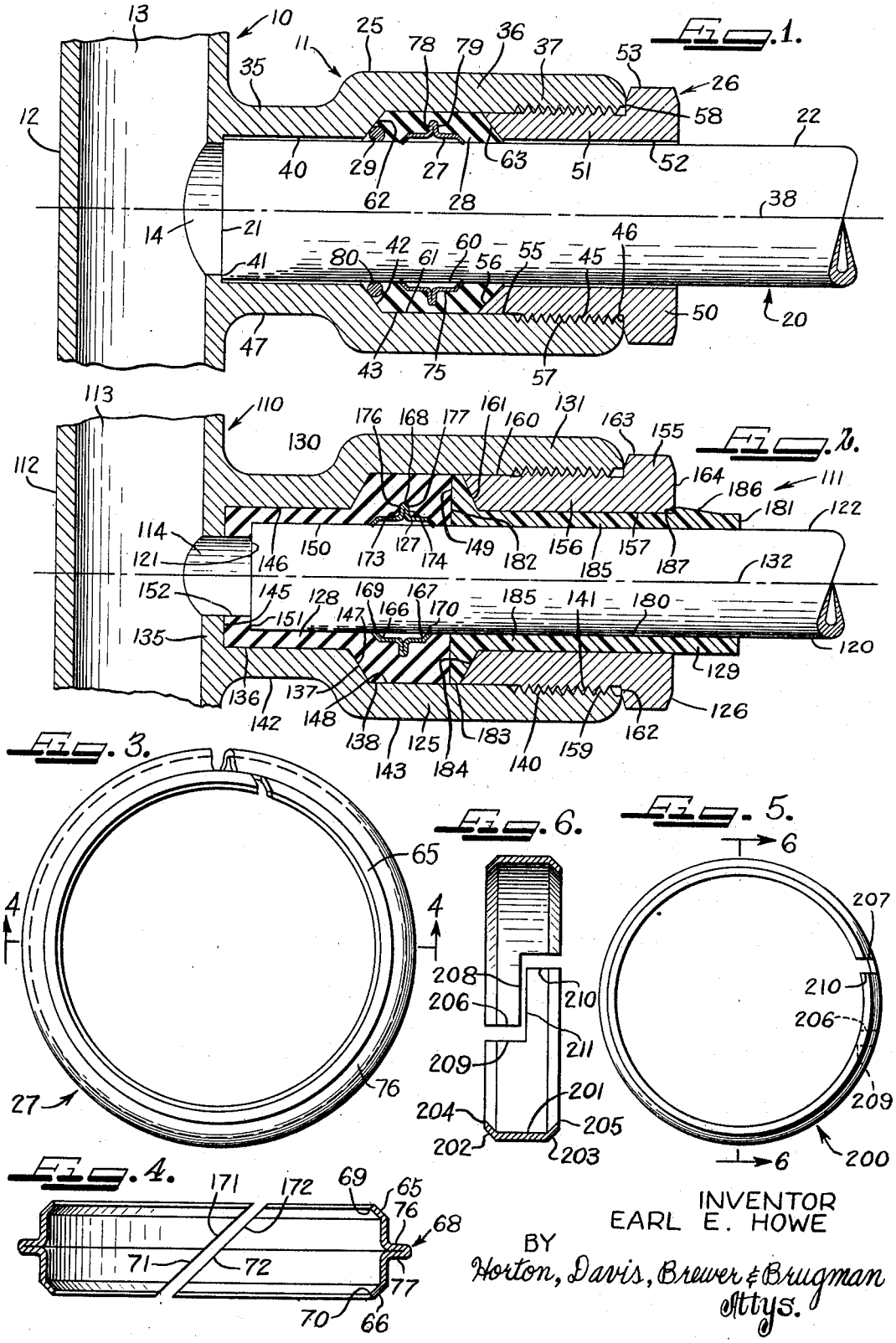
INVENTOR
EARL E. HOWE
BY
Horton, Davis, Brewer & Brugman
Attys.

Dec. 23, 1969 E. E. HOWE 3,485,517
PRESSURE FITTING FOR PIPES CARRYING GASEOUS FLUIDS
Filed May 8, 1968 2 Sheets-Sheet 2
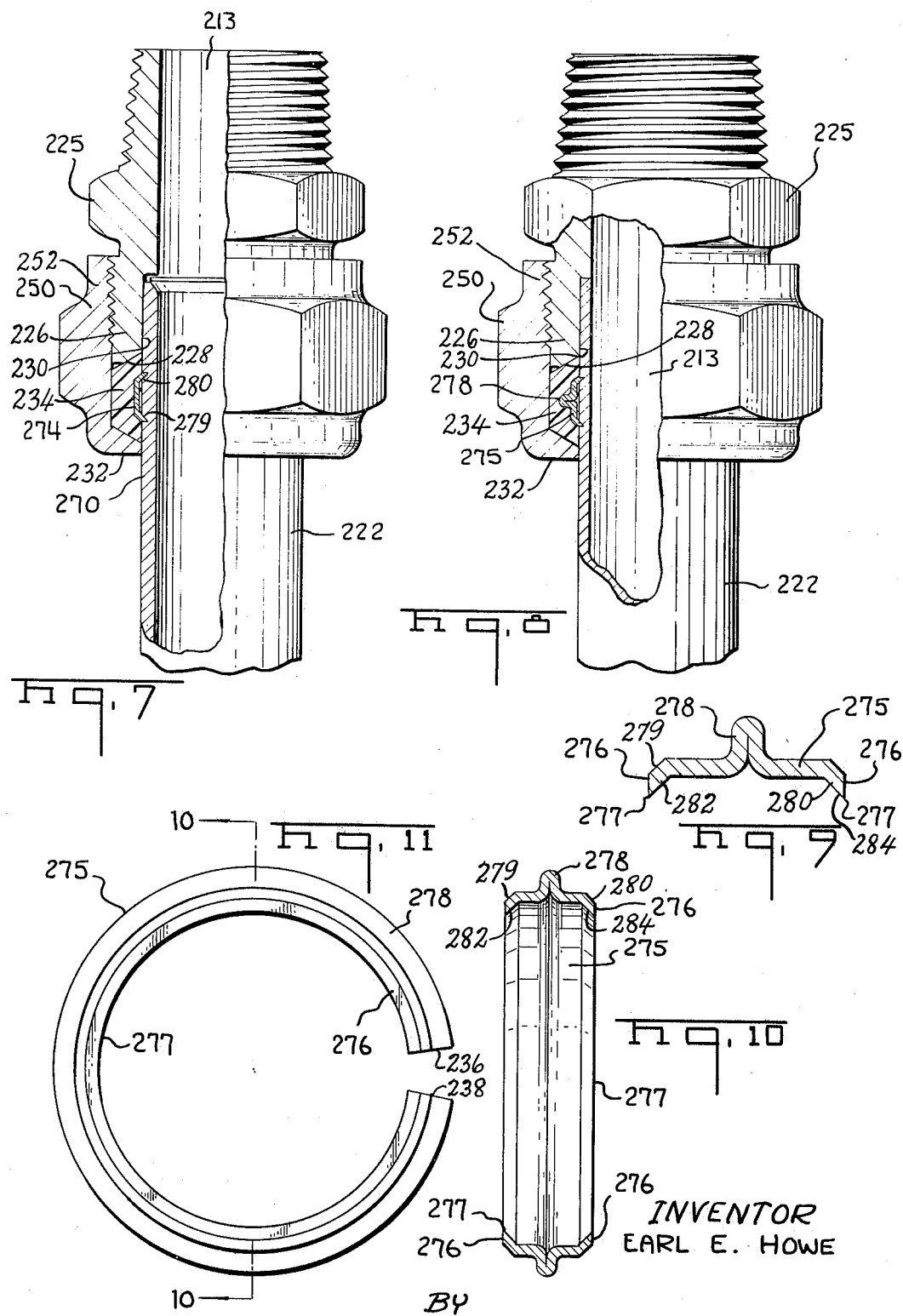
INVENTOR
EARL E. HOWE
BY United States Patent Office 3,485,517
Patented Dec. 23, 1969

3,485,517
PRESSURE FITTING FOR PIPES CARRYING GASEOUS FLUIDS
Earl E. Howe, 6101 N. Sheridan Road,
Chicago, Ill. 60626
Continuation-in-part of application Ser. No. 503,163,
Oct. 23, 1965. This application May 8, 1968, Ser.
No. 738,365
Int. Cl. F16l *17/00, 19/06, 19/08*
U.S. Cl. 285—341          3 Claims

ABSTRACT OF THE DISCLOSURE

A sealing and locking device for use in sealing and locking a fitting on a pipe. An elastòmeric sealing annulus carries a locking ferrule on the inner surface. The ferrule is provided with a pair of oppositely facing chisel edges having one side planar and normal to the axis of a pipe. The fitting is held against longitudinal movement along the pipe by the planar sides.

DISCLOSURE OF THE INVENTION

This is a continuation-in-part of my pending application Ser. No. 503,163, filed Oct. 23, 1965, and now abandoned.

This invention relates generally to compression fittings for use with threadless or smooth walled pipes and tubes, and more particularly to an inmproved compression fitting for use in piping systems carrying gaseous fluids.

Connections between pipes and tubes used to conduct gaseous fluids present problems which normally are not encountered in the transmission of other liquids. This is especially true when the gas is one which is highly combustible or which will support and aid combustion readily.

Because fluids in their gaseous state have much lower viscosity than liquids, they will pass (leak) more readily through paths developed by improper mating of the body, nut, and seal of a fitting and the tubing with which it is engaged. In addition, fluids in their gaseous state may be colorless and odorless and hence, not visible to the naked eye or detectable by smell. Thus, while a leak in a piping system containing a liquid may be detected readily by visual inspection, special detecting equipment will ordinarily be required to detect and locate leaks in a piping system containing a gas. It is desirable, therefore, that compression fittings used with pipes and conduits of gas transmission systems be so constructed that a predetermined amount of engagement of the fitting with the conduit will consistently produce a positive seal therebetween.

Further, in the transmission of inherently explosive media such as combustible and combustion supporting gases, it is imparative that electrical charges to which the transmission system is subjected be so controlled that no discharge, or spark will occur within the systems or between the system and other elements in the environment in which the system is located.

Static electricity, and in fact any C.M.F., to which a transmission system carrying such combustible gases is subject, therefore must be subjugated by conducting and transferring potentially harmful electrical charges through the system and away therefrom by appropriate means, such as grounding, and/or by isolating the electrical charge from the gas within the system.

It is therefore an object of this invention to provide a compression fitting for use in a gas transmission system which is capable of sealing engagement with smooth walled pipe or tube.

A further object of this invention is to provide a compression fitting for use in a gas transmission system which is adapted to provide positive mechanical and electrical connection between the fitting and a smooth walled pipe or tube.

A further object of this invention is to provide a compression fitting for use in a gas transmission system which includes means to electrically insulate the junction between the compression fitting and an electrically conductive smooth walled pipe or tube engaged thereby, while retaining sealing engagement therewith.

A further object of this invention is to provide a compression fitting for use in a gas transmission system which includes means to produce a predetermined degree of compressive sealing between the fitting and a smooth walled pipe or tube engaged thereby and consistently assures positive sealing engagement therebetween.

Another object of this invention is to provide a compression fitting for use in a gas transmission system which includes means to axially anchor threadless or smooth walled pipe or tube formed of soft metals and hard metals without crushing the pipe or tube.

Having thus described my invention, the above objects will become apparent to those having ordinary skill in the art from the following description of a presently preferred embodiment of my invention as illustrated in the drawings in which:

FIG. 1 is a longitudinal section view of the electrically conducting compression fitting of this invention assembled in sealing engagement with a section of pipe or tubing;

FIG. 2 is a longitudinal sectional view, similar to FIG. 1, of an electrically insulated compression fitting assembly according to this invention.

FIG. 3 is in enlarged front elevational view of one form of locking ferrule according to this invention;

FIG. 4 is a sectional view of the ferrule of FIG. 3 taken along line 4—4 and looking in the direction of the arrows thereon;

FIG. 5 is an enlarged frontal view of another form of locking ferrule useful with this invention;

FIG. 6 is a sectional view of the ferrule seen in FIG. 5 taken along line 6—6 and looking in the direction of the arrows thereon;

FIG. 7 is a sectional view of a fitting using the ferrule of FIG. 6;

FIG. 8 is a sectional view of another modification of the nivention with the ferrule of FIG. 11;

FIG. 9 is a cross section on an enlarged scale of the ferrule of FIG. 10;

FIG. 10 is a view taken on the line 10—10 of FIG. 11, and

FIG. 11 is a side view of a ferrule used in FIG. 8.

This invention is directed to compression fittings which are adapted to conduct fluid and to isolate the same from charges of electricity in piping systems using metallic smooth walled pipes and tubes. One embodiment of this invention therefore comprises a compression fitting which will provide a positive electric conducting path between the fitting and a pipe or tube engaged therein so that electrical charges pass from the pipe or tube to the fitting and from the fitting to the pipe or tube. The electrically conducting compressing fitting of this invention, indicated generally by numeral 10, in FIG. 1, will be described first as a matter of convenience.

An electrically insulated fitting according to this invention, indicated generally by numeral 110, in FIG. 2, will be described after the description of compression fitting 10.

Referring first to FIG. 1, it will be noted that conducting fitting 10 is shown as comprising connector 11 which serves to releasably interconnect fitting 10 with tube 20.

For the purpose of describing a preferred embodiment of my invention, fitting 10 will be described as a T (not shown), although any fitting, such as an elbow, coupling, adaptor, reducer and an article of equipment which includes at least one connector 11, is within the scope of this invention. Briefly, fitting 10 comprises connector 11 having a body which, as shown herein, is formed integrally with T portion 12, having pipe connecting means (not shown) at each of the opposite ends of T portion 12. Fitting 10 includes T passage 13 which is in open communication with connector 11 and tube 20 by means of communicating passage 14. Fitting 10 is formed of steel in this embodiment, although it will be understood that such may be formed of any conventional metal suitable for use in compression fittings, such as, for example, brass, bronze, aluminum, iron and the like. In each case, factors such as pressure, chemical character, and temperature of the particular gaseous fluid being transmitted, determines the material of which the fitting will best be formed.

Tube 20 is a conventional ⅞ inch O.D. copper tube, type L, such as is commonly employed to supply gas to a domestic hot water heater. However, it will be understood that the fitting of this invention is not limited to use with copper tubing but is equally adapted to use with pipe and tubing formed of materials such as aluminum, copper, brass, steel and iron. Tube 20 has an inner end 21 and an outside 22 of outside diameter in the order of ⅞ inch.

Connector 11, as shown in FIG. 1, includes a cylindrical body 25, a male nut 26 which is threadedly engageable in one end of body 25, a locking ferrule 27 which is partially embedded in a compression seal 28, and a conducting ring 29, all of which cooperate to receive and retain an end portion of tube 20 in a manner to be described hereinafter.

Body 25 is formed with a tube receiving and positioning portion 35, a seal retaining portion 36, and a nut receiving portion 37, all of which are arranged concentrically with respect to major axis 38 of body 25. Tube receiving and positioning portion 35 defines a cylindrical socket which includes a cylindrical side wall 40 of an inside diameter slihgtly greater than the outside diameter of tube 20 so as to slidingly receive tube 20 therein. Wall 40 terminates in an annualr shoulder 41 which extends radially inwardly from cylindrical wall 40 to communicating passage 14 between connector 11 and T passage 13 of fitting 10. The inside diameter of communicating passage 14 corresponds generally in size to the inside diameter of tube 20 to assure free passage of a gaseous fluid through fitting 10. The dimensions of shoulder 41 are thus approximately the same as tube end 21, so that shoulder 41 operates to limit movement of tube 20 relative to body 25 and thereby axially positions tube 20 within fitting 10, upon abutting engagement with tube end 21.

Seal retaining portion 36 and nut receiving portion 37 of body 25 extend coaxially from one end of tube receiving and positioning portion 35. Seal retaining portion 36 is formed with inclined end shoulder 42 which inclines outwardly from the outer end of cylindrical wall 40 of tube receiving and positioning portion 35. Shoulder 42 intersects a cylindrical surface 42 spaced radially outwardly of cylindrical wall 40. Inclined shoulder 42 and cylindrical surface 43 are adapted to receive an elastomeric seal 28 in contiguous relationship with the tube 20 in manner to be described hereinafter.

The axial extent of cylindrical surface 43 is greater than the axial extent of seal 28 when the latter is compressed as required to provide a guide portion which is adapted to closely receive the end of nut 26. Thus, the innermost internal thread 45 of nut receiving portion 37 is spaced axially from seal 28 when seal 28 is operatively positioned in seal retaining portion 36. In this embodiment, the inside diameter of internal threads 45 is substantially the same as the inside diameter of cylindrical surface 43, although it will be understood that this relationship is not essential to the concepts of this invention. Body 25 terminates in an end wall 46 which defines the axial extent thereof. Outside walls 47 and 48 of the body 25 are spaced radially outwardly of cylindrical wall 40 and cylindrical surface 43 respectively and define the wall thickness of body 25. Among other things, the wall thickness of body 25 is determined by the pressure of the gaseous fluid being transmitted and the material of which body 25 is composed. In this embodiment body 25 is formed of steel and is designed to operate at a standard 125 p.s.i. pressure, so that body 25 is formed to a thickness which complies with standards set by The American Gas Association for such pressure when formed of steel.

Nut 26 is a tubular member, and like body 25, in this embodiment is formed of steel. Nut 26 includes a head portion 50, an externally threaded sleve portion 51 and and a cylindrical interior surface 52 which defines a bore of substantially the same inside diameter as cylindrical wall 40 of tube receiving and positioning portion 35. The head portion 50 of the nut is adapted to receive a torque imparting tool, and in this embodiment bears a plurality of flat surface portions 53 receptive of the opposite jaws of a conventional two jaw wrench. Sleeve portion 51 has an externally threaded portion which extends partially along its length from adjacent head portion 50 and bears a plurality of external threads 57, cylindrical extension 55 reaches axially from the outer end of the threaded portion to an inwardly inclined beveled end 56.

External threads 57 of nut 26 are conformable to internal threads 45 of body 25 and are adapted to be threadedly received therein.

The outside diameter of cylindrical extension 55 is slightly less than the inside diameter of cylindrical surface 43 of seal retaining portion 36 and is adapated therefor to be received rotatably therewithin. Bevelled end 56 of nut 26 is angularly inclined with respect to cylindrical inner surface 52, the inclination thereof intersectingly opposing the slope of the opposite inclined shoulder 42 of portion 36. Thus, when nut 26 is threadedly engaged in body 25, inclined shoulder 42 and bevelled end 56 define axially spaced inclined end walls of a seal retaining chamber within portion 36; the same being oppositely inclined with respect to the bore axis 38 of the fitting.

As shown in FIG. 1, head portion 50 also includes an annular stop shoulder 58 which extends radially beyond sleeve portion 51 and is adapted to abuttingly engage end wall 46 of the body 25 as nut 26 advances along the threads 57. Shoulder 58 and end wall 46 cooperate to limit the axial movement of nut 26 into body 25 and thereby determine a predetermined axial compression of the seal retaining chambers within portion 36.

Seal 28 is formed of an elastomeric material, such as, for example, rubber, neoprene, plastic and the like. Seal 28 is formed generally as an annular sleeve having a cylindrical inner surface 60, a cylindrical outer surface 61 concentric with surface 60 and oppositely inclined end walls 62 and 63. The diameter of cylindrical inner surface 60 is slightly less than the outside diameter of tube 20, but is slidable over the tube's outside wall 22. The outside diameter of cylindrical outer surface 61 is slightly less than the diameter of cylindrical surface 43 of seal retaining portion 36, and the inclined end walls 62 and 63 are comformable to inclined shoulder 42 of body 25 and bevelled end 56 of nut 26, respectively. The axial length of the seal 28 is intentionally greater than the distance between inclined shoulder 42 and bevelled end 56 when the nut 26 is advanced fully to its sealing position whereat the shoulder 58 thereon is abuttingly engaged with end wall 46 of the body 25.

Two locking rings or ferrules used with this invention are illustrated in the drawings. One is shown in FIGS. 3 and 4 and the other is shown in FIGS. 5 and 6. Ferrule 27, shown at FIGS. 3 and 4 is illustrated in its operative position at FIG. 1 to comprise a split ring, preferably formed of spring steel to provide sufficient resiliency to permit the same to be closed radially, and to provide tube gripping edges of sufficient hardness to bite into the outside surface 22 of tube 20 when the ferrule 27 is closed thereover. As shown in FIG. 4, ferrule 27 includes a tubular body portion having inclined leg portions 65 and 66 at the opposite axial ends thereof, and a medial circumferential rib 68 extending radially outwardly from the outer circumference of body portion 67 intermediates its ends. Legs 65 and 66 slope divergently inward of body portion 67 and terminate with sharp peripheral edges 69 and 70 respectively. Peripheral edges 69 and 70 have like inside diameters and each is defined as a V-shaped edge. Rib 68 extends radially outwardly from body portion 67 and in the embodiment illustrated is formed by re-entrantly folding a central portion of the body portion 67 and subsequently pressing the opposite side of the central portion toward and into engagement with one another to form a double walled structure. However, it will be understood that rib 68 may be formed by other means such as by welding a ring member to body portion 67 or by machining operations. Ferrule 27 is particularly adapted for use with soft copper tubing with rib 68 thereof performing a function, to be described more fully hereinafter, which assures the integrity of the tubing.

As shown, ferrule 27 is split, preferably diagonally, to provide a gap in its circumference, defined between end surfaces 71 and 72. As seen in FIG. 4, end surfaces 71 and 72 are formed at an angle of approximately 45° diagonals with respect to a plane passing normal to the central axis of ferrule 27 and coincident with the rib 68. It will be understood that the angular relationship of end surfaces 71 and 72 is a matter of choice with the 45° relationship being the preferred form. The inside diameter of peripheral biting edges 69 and 70 are slightly greater than the outside diameter of the external wall 22 of tube 20 when the ferrule 27 is in its free form. However, when the end surfaces 71 and 72 approach abutting relationship, the resultant inside diameter of peripheral edges 69 and 70 is slightly less than the outside diameter of tube 20 to lock the ferrule 27 on the tubes.

As shown in FIG. 1, ferrule 27 is mounted within a conforming groove 75 formed radially outward in the cylindrical surface 60 of seal 28 intermediate the end portions 62 and 63 thereof. Ferrule 27 may be removed from groove 75 by radially compressing the same and slightly stretching the seal 28 thereover.

When ferrule 27 is fitted within the conforming groove 75, it is restrained from axial movement with respect to seal 28 largely by reason of the rib 68 and the axial restraint produced by legs 65 and 66 plus the frictional engagement between portion 67 and groove 75. Thus, the opposite annular ring portions 76 and 77 of rib 68 bear against the respective annular walls 78 and 79 of groove 75 when ferrule 27 is subjected to axial compressive force. Rib 68 importantly provides radial rigidity to ferrule 27 so that external forces acting radially inwardly on the ferrule when it is operatively closed over a soft copper tube, are equalized on the peripheral anchor edges 69 and 70 thereof. By provision of rib 68 the peripheral edges 69 and 70 of ferrule 27 are evenly loaded to grip the outside wall 22 of a soft copper tube 20 without crushing or distorting tube 20.

Conducting ring 29 is a circular metal ring member split or broken at a point along its circumference or alternately a garter spring to permit the diameter of the ring to be modified. Although conducting ring 29 may be formed of any yieldable electrically conducting material, I have found that bronze provides the most suitable qualities and is preferred. The outside surface 80 of conducting ring 29 defines generally a torus, having an inside diameter slightly less than the outside diameter of tube 20. In the preferred embodiment, conducting ring 29 is molded in seal 28 at the junction between inclined end portion 62 and cylindrical inner surface 60 thereof. By forming conducting ring 29 and seal 28 as a unit and by co-operatively engaging ferrule 27 into conforming groove 75, the seal, ferrule, and conducting ring may be stored and assembled as a unit thus avoiding delays caused by individual alignment and assembly and lost elements. However, it will be understood that conducting ring 29 may also be an individual element of the combination which is positioned therein as described above in assembly.

In order to releasably engage fitting 10 with tube 20, end 21 thereof is first prepared by removing all ridges and burrs caused by the tube cutting process. Nut 26 is then loosely fitted in threads 37, after insertion of ferrule 27, conducting ring 29, and seal 28 in the chamber. As stated above, the inside diameter of conducting ring 29 and seal 28 are slightly less than the outside diameter of outer wall 2 of tube 20 but not sufficiently smaller to prevent sliding the tube axially into the assembled fitting 10. Tube 20, is fully inserted into body 25 and moved into tube receiving and positioning portion 35 to place the end 21 thereof abuttingly against shoulder 41. Nut 26 is thereafter advanced axially into body 25 with the end 56 of nut 26 pressing against inclined end portion 63 of seal 28, driving the latter into seal retaining portion 36. As nut 26 continues to advance threadedly into body 25, inclined end portion 62 of seal 28 is pressed into engagement with inclined shoulder 42 of seal retaining chamber 36. At this point seal 28 is contiguously surrounded by inclined shoulder 42, the cylindrical surface 43 of seal retaining portion 36, bevelled end 56 of nut 26, and outside wall 22 of tube 20. This occurs while shoulder 58 of nut 26 is spaced axially away from end wall 46 of body 25. Continued threaded movement of nut 26 acts to axially and radially compress elastomeric seal 28. When shoulder 58 of nut 26 is moved into engagement with end wall 46 of the body 25 the maximum predetermined and permitted amount of compression is achieved. This maximum amount of compression is predetermined in each case by the extent of axial movement of nut 26 between first full contact of seal 28 within seal retaining portion 36 and engagement of shoulder 58 against end wall 46. End wall 46 and shoulder 58 thus provide positive means to limit compression of seal 28 and to provide consistent optimum sealing of the junction between tube 20 and connector 11 and locking ring 27.

As the seal 28 is compressed it exerts a reactive force outward in all directions and both ferrule 27 and conducting ring 29 are subjected to radially inwardly acting forces which operate to move the ends thereof at their respective gaps toward one another. As end surfaces 71 and 72 of ferrule 27 are moved toward one another the inside diameter of peripheral edges 69 and 70 is decreased bringing them successively into contact with outside wall 22 of tube 20 and then into surface biting engagement therewith. The maximum compression of seal 28 is predetermined to bring ferrule end surfaces 71 and 72 almost into abutting relationship, in which state the peripheral anchor edges 69 and 70 are locked in outside wall 22 to grip tube 20 without crushing it; the rib 68 serving to prevent radial collapse of the ring and maintain body portion 67 radially spaced from the exterior of the tube 20.

It will be noted that conductive ring 29 is in continuous contact with outer wall 22 of tube 20 and inclined shoulder 42 of body 25, when seal 28 is in its sealing position. Compressing seal 28 also operates to exert radially inward and axial forces on conducting ring 29 forcing surface 80 thereof into positive mechanical contact with inclined shoulder 42 of body 25 and outer wall 22 of tube 20. Conducting ring 29 thus forms a positive electrical conducting path between tube 20 and fitting 10 and prevents extrusion of the seal therepast.

In addition, compressing seal 28 serves to seal the annular passage defined by tube 20 and connector 11. The degree of compression exerted on seal 28 by threadedly engaging nut 26 to its axial limit against end wall 46 of body 25 is adapted to consistently provide an effective seal in connector 11 within the range of alignment permitted by the difference in diameter of connector 11 and tube 20, regardless of the skill of the mechanic using the fitting.

As described above, compressing seal 28 serves to seal the annular passage defined between connector 11 and tube 20 and to force ferrule 27 into anchoring engagement with outside wall 22 of tube 20. It also will be understood that the extent to which the peripheral anchor edges 69 and 70 of the ferrule indent or bite into wall 22 of tube 20 in order to provide axial restraint between tube 20 and connector 11 for a given pressure standard, is dependent upon such factors as the relative hardness of the particular ferrule and tube to be connected. When fitting 10 is operatively connected in a piping system, fluid pressure in the piping system tends to force tube 20 axially from connector 11. Ferrule 27, by reason of its anchored engagement with the tube 20, transmits such axial separating force to seal 28. The seal 28, in turn acts to axially restrain ferrule 27 therewithin while body 25 and nut 26 receive and restrain the axial thrust exerted on seal 28 by ferrule 27, thus resisting axial movement between tube 20 and the connector 11 in operation.

Referring now to FIG. 2, it will be understood that the modified fitting 110 shown therein is electrically non-conductive or insulated and includes a connector 111 to releasably interconnect fitting 110 with tube 120. As in the embodiment of conducting fitting 10, insulated fitting 110 may be in the form of a T although such may constitute any of the standard fittings described hereinbefore.

The insulated connector 111 includes a metal body 125 which is formed integrally with a metal T portion 112 having pipe connecting means (not shown) at each of its opposite ends. A passage 113 within portion 112 communicates with the interior of insulated connector 111 and tube 120 via passageway 114.

Tube 120, like previously described tube 20, is a conventional soft copper tube, commonly employed to supply gas to domestic gas fired equipment. End portion 121 of the tube, having outside wall 122 is adapted to be inserted in the fitting connector portion 111.

Insulated connector 111, as shown in FIG. 2, includes a generally cylindrical body 125, a nut 126 which is threadedly engageable in one end of body 125, a ring or ferrule 127, a compression seal 128 and an insulating sleeve 129, all of which cooperate to receive and retain tube 120 in a manner to be described hereinafter.

Body 125 comprises a seal retaining portion 130 having a nut receiving portion 131 at its outer end and both of which are arranged coaxially of the major axis 132 of body 125. Seal retaining portion 130 is formed with a generally cylindrical socket at its axially inner end which is in open communication with T passage 113 by means of the communicating passage 114.

An annular shoulder wall 135 extends radially into and defines the communicating passage 114 as well as the axial extent or inner end of seal retaining portion 130. Cylindrical surface 136 defines the radial boundary of an effective socket portion of seal retaining portion 130 and such extends coaxially away from annular shoulder wall 135 to an outwardly inclined shoulder 137 which intersects a second cylindrical wall 138 of larger diameter than surface 136, but coaxially related therewith.

The nut receiving portion 131 of the body 125 is axially contiguous to seal retaining portion 130 and includes a plurality of internal threads 140 adjacent its outer end which are adapted to receive mating threads 141 on nut 126 in assembly. As shown, internal threads 140 are formed in the outer end portion of cylindrical wall 138, extended, so that the inside diameter of the threaded and cylindrical wall 138 are equal. It will be understood, however, that the inside diameter of threads 140 may be different from the diameter of cylindrical wall 138.

Outside walls 142 and 143 of body 125 are spaced radially outwardly of cylindrical surface 136 and cylindrical wall 138, respectively, and define therewith the wall thickness of tubular body 125. As in fitting 10, the wall thickness of body 125 is determined by a plurality of factors but is formed to comply with standards set by the American Gas Association for a given pressure.

The seal 128, is formed as a generally elastic tubular member having an outside configuration which conforms to the surfaces defined by seal retaining portion 130. Thus, inner end 145 thereof defines an annular ring conforming to annular shoulder portion 135 while a cylindrical portion 146 extends axially from end portion 145 with an outside diameter substantially the same as the inside diameter of cylindrical surface 136. Projecting radially outward of the outer axial end of portion 146 is an inclined shoulder 147, which matingly conforms and opposingly engages the inclined shoulder 137 of seal retaining portion 130. An outer cylindrical surface 148 defines the radial extent of shoulder 147 and extends axially from inclined shoulder 147 to outer end 149 of the seal which is formed at right angles to surface 148. The axial extent of cylindrical surface 148 is so arranged that the seal's outer end 149 is spaced axially inwardly of the inner end of the nut 126 and the innermost or leading one of the internal threads 141 when the seal 128 is mounted in seal retaining portion 130. An inner cylindrical surface 150 of the seal, having an inside diameter slightly less than the outside diameter of tube 120 is adapted to coaxially receive the latter. Inner cylindrical surface 150 extends axially from the seal's outer end 149 to a radially inwardly extending annular shoulder surface 151, which lies parallel to the seal's inner end 145. A cylindrical orifice 152 extends between shoulder 151 and the seal's inner end 145; the same having a diameter substantially equal to the diameter of passageway 114. When seal 128 is positioned in its operative position in seal retaining portion 130, orifice 152 forms a continuation of communicating passage 114. Shoulder surface 151 performs a function corresponding to that performed by the previously described shoulder 41 of fitting 10, i.e., it engages and stops the end 121 of tube 120 in final assembly while maintaining the tube end spaced from the metal web wall provided by portion 135, thus maintaining the same out of electrical contact.

Nut 126 is generally similar to nut 26 of fitting 10, except that it has an inside diameter which is somewhat greater than the outside diameter of the tube 120. Thus when nut 126 is fully positioned in body 125, the inner cylindrical surface 157 thereof is spaced radially away from the outside wall of tube 120. Like nut 26, nut 126 is a generally tubular member having an enlarged head portion 155 at its outer end, a tubular sleeve portion 156 projecting coaxially inwardly of the head portion and an inner cylindrical bore defining surface 157.

Sleeve portion 156 is provided with external threads 159, which mate with internal threads 141 in operation while a smooth exterior cylindrical extension 160 projects axially beyond the thread 159, and terminates in an inwardly bevelled end surface 161. The outside diameter of the cylindrical extension 160 is slightly less than the inside diameter of the cylindrical wall 138 and is slidably receivable therein. Bevelled end 161 of nut 126 is inclined oppositely to inclined shoulder 137 and cooperates therewith when compressing the seal 128.

Head portion 155 of the nut has a stop shoulder 162 which extends radially beyond the threads 159 to abuttingly engage the outer end of the fitting body 125. A plurality of chordal flat surface portions 163 are formed on the nut's periphery to receive the jaws of a two-jawed wrench or the like whereby the nut may be torqued.

Ferrule 127 is identical to ferrule 27 previously described and performs the same function and operates in the same manner as stated above in the description of fitting 10, shown in FIG. 1. In brief, however, ferrule 127 includes an annular body sleeve portion having radially inwardly extending anchor legs 166 and 167 at the opposite axial ends and a circumferentially projecting rib 168 which extends radially outward from portion 165. Legs 166 and 167 terminate in peripheral anchor edges 169 and 170, respectively. As described hereinbefore, peripheral edges 169 and 170 have like inside diameters and each defines a V-shaped biting edge adapted to bite into the tube's exterior. Rib 168 is formed like rib 68 and ferrule 127 is split or broken to provide a gap in its circumference, defined by opposing end surfaces 171 and 172. The inside diameter of ferrule 127 is slightly greater than the outside diameter of tube 120 when ferrule 127 is in its free form, but moving end surfaces 171 and 172 almost into abutting relationship operates to reduce the inside diameter of peripheral edges 169 and 170 to less than the outside diameter of tube 120. Ferrule 127, like ferrule 27, is mounted in its associated seal 128, as shown in FIG. 2; seal 128 having an annular indented groove 175 which conforms in configuration to the form of the outer surfaces of ferrule 127 and axially anchors the same in the seal 128. Grove 175 is disposed in that portion of seal 128 which is defined axially between outer end 149 and inclined shoulder 147 thereof. The function of rib 168 in ferrule 127 is identical to the function hereinbefore described for rib 58 of ferrule 27. In operation the locking peripheral edges 169 and 170 uniformly bite and grip outside wall 122 of soft copper tube 120 without crushing or distorting tube 120 in any way.

The insulated sleeve 129 of the FIG. 2 fitting is adapted to spacedly support the tube 120 from contacting the metal body 125 and nut 126. To this end sleeve 129 is a generally tubular member formed of a dielectric material having a body strength suitable to maintain the aforementioned spacing between tube 120 and the metallic elements of insulated connector 111. A material such as nylon is suitable for forming insulated sleeve 129.

In the embodiment illustrated, this sleeve 129 has cylindrical bore 180 extending axially therethrough from its outer end 181 to its inner end 182. The inside diameter of bore surface 180 is only slightly greater than the outside diameter of tube 120 so as to permit the latter to slide through the insulated sleeve 129. Inner end 182 comprises an annular surface normal to the longitudinal axis of sleeve 129 and coextensive to outer end 149 of seal 128. In operation end 182 is adapted to abuttingly engage the seal's outer end 149 (see FIG. 2). The outer periphery of end 182, is defined by a short cylindrical surface 183 of a diameter slidingly interfittable with the cylindrical wall 138 of the seal retaining portion 130. Extending inwardly of surface 183 is an inclined shoulder 184, which conforms to the sloping inner end 161 of the nut 126 and which intersects the outer cylindrical surface of the sleeves main body portion 185 having a diameter conformable in dimension to the axial cylindrical bore surface 157 of the nut member.

Insulated sleeve 129 is removably locked to nut 126. In order to retain insulated sleeve 129 in nut 126, a radial detent 186 is provided adjacent the outer end 181 of the sleeve; such including a radially extending shoulder 187 which extends partially over the outer end 164 of the nut member in assembling the sleeve with the latter. In this regard the sleeve 129, being nylon or the like, is resilient and can therefor be axially inserted through the bore 157 of the nut, permitting the detent projection 186 to snap outwardly as it clears the nut's outer end to lock the sleeve 129 in assembly with the nut.

In order to releasably engage insulated fitting 110 with copper tube 120, end 121 thereof is first prepared by removing all ridges and burrs caused by the tube cutting process. The fitting elements are then loosely assembled by inserting the seal 128 with assembled ferrule 127, insulating sleeve 129 and nut 126 into body 125 in the order shown in FIG. 2. The tube end 121 is then inserted into the fitting until it abuts shoulder 151 of the seal. Nut 126 is then torqued to axially advance the same into the body 125.

Continued threaded movement of nut 126 will bring inner end 182 of insulated sleeve 129 into abutment with outer end 149 of seal 128 before the shoulder 162 on the nut's head portion 155 engages the outer end of the fitting body 125. At this point, the portion of tube 120 engaged within insulated connector 111 is externally surrounded by non-conducting seal 128 and insulated sleeve 129. Subsequent movement of nut 126 into body 125 to a position whereat the latter's end wall is abuttingly engaged by shoulder 162 operates to compress seal 128, lock the ferrule 127 to the tube, all hereinbefore described in the description of fitting 10, while maintaining the tube 120 and connector 111 in electrically insulated relation.

Ferrule 200, illustrated in FIGS. 5 and 6, is like the above described ferrules 27 and 127, adapted for use with the described fittings 10 and 110. Ferrule 200 is a broken ring and generally is used with tubing formed of materials such as iron and steel, which are harder and, having a greater modulus of elasticity than copper, provide a tubing of greater resistance to distortion and crushing then is experienced with soft copper tubes.

As shown, ferrule 200 is a split annular ring formed of spring steel and is formed with a generally tubular body portion 201 having angularly inwardly extending divergent legs 202 and 203 at its opposite axial ends. Legs 202 and 203 terminate in sharpened V-shape peripheral edges 204 and 205, respectively. Peripheral edges 204 and 205, like the corresponding peripheral edges of the described ferrules 27 and 28 and 127, have like inside diameters slightly greater than the outside diameter of the tube with which they are adapted for use.

The break or split through the body portion, as shown in FIGS. 5 and 6, is generally Z shaped providing end surfaces 206 and 207, which are circumferentially offset and interjoined by a circumferentially extending wall 208. End surfaces 206 and 207 are respectively opposed by spaced end surfaces 209 and 210, which are interjoined by a circumferentially extending wall 211, opposite wall 208. The two circumferential walls 211 and 208, as shown, are spaced slightly apart axially to permit relative circumferential movement between the two overlapping ends of the ferrule. The opposing end surfaces 206, 209, 207 and 210 are similarly separated by gaps to permit circumferential closing of the ring. However, in using ferrule 200 in either of the fittings of FIGS. 1 and 2, the oppositely disposed end surfaces thereof normally are not brought into abutting engagement, as such a limit means is generally unnecessary when ferrule 200 is used with iron and steel tubes.

In the forms of the invention illustrated in FIGS. 7–11 there is disclosed a coupling element 225 having a threaded collar portion 226, a tapered end surface 228, a smooth internal bore 230 and a conduit portion 213. A compressing nut 250 having a threaded collar portion 252 and a radially extending end wall 232 is threaded onto the portion 226. A smooth walled pipe 222 is fitted into the bore 230 and forms a closed chamber with the nut and element 225. A sealing annulus 234 formed of an elastomeric material, such as heretofore described is mounted in the chamber and is formed with a seat to receive a locking ferrule. In the form of the invention illustrated in FIG. 7, the ferrule 274 is formed with a tubular body portion and divergent legs such as described with respect to FIGS. 5 and 6. In this form of the invention the body portion is split along a radial plane such as shown in FIG. 11. The amount the ends 236 and 238 are separated is such as to permit the pipe to be moved without locking contact with the sharp edges 277 but when the ends are in contact the tube becomes a solid ring to prevent crushing of the sharp edges 277.

In the form of the invention illustrated in FIGS. 8–11 the tubular body portion is provided with a rib 278 such as illustrated in FIG. 4.

The tubular body of FIGS. 5–11 is provided with laterally and radially inwardly extending legs 279 and 280. The ends of the legs are ground to provide surfaces 276 normal to the axis of the tubular body. The surface 282 and 284 intersect the planar surfaces 276 to form biting edges 277.

In use, the pipe is assembled with the fitting by inserting it through wall 232, through the seal and ferrule, and into bore 230. The compressing nut is then further threaded onto the collar portion 226 to compress the annulus 234 against the pipe and ferrule. The compression force on the ferrule will force the edges 277 to move normal to the axis of the tubular body whereby to become embedded in the pipe to thereby lock the fitting against longitudinal movement along the pipe. The tendency to move longitudinally is resisted by normal surfaces 276 which have no vertical component tending to reduce the depth of bite. The normal arrangement of surfaces 276 facing the sealing annulus allows no pressure of the seal to engage under the legs to produce a lifting force. The locking engagement of these surfaces can only be reduced by reducing the pressure on the sealing annulus to allow the ferrule to resume its unstressed contour with the ends separated as shown in FIG. 11. The ferrule is made of hardened spring steel which is readily contractible and will resume its original contour even after a number of uses.

While the foregoing description of this invention has been set out in association with a particular pipe fitting, it will be understood by those familiar with the art that the concepts expressed herein are readily adaptable for use with other types of pipe fittings, and that the described structures are likewise capable of modification and substitution of equivalents, without departing from the spirit and scope of this invention.

I claim:
1. A releasible conduit joint coupling device comprising a coupling element having an axial collar portion with a smooth internal bore of a diameter to receive a smooth outer surface of a conduit, a compressing nut having a collar portion threaded to said first collar portion and having a radially extending wall, a conduit in said bore, said conduit, coupling element and nut defining a substantially closed annular chamber, an annular elastomeric seal in said chamber, and a resilient spring-like, metallic locking ferrule of substantially uniform thickness seated in said seal, said locking ferrule comprising a cylindrical split ring formed with laterally and radially inwardy extending side portions, each portion comprising a planar surface normal to the axis of the ring and defining an end surface thereof, and substantially parallel inner and outer surfaces intersecting said planar surface and converging, from a base lying within the ring toward said axis beyond the end of the ring; the inner surface of the seal and the intersection of said inner and planar surfaces being of greater diameter than the outer surface of the conduit whereby the seal and ferrule are freely movable coaxially over the conduit in either direction; said inner surface of the seal being in compressing contact with the outer surface of the conduit with the intersection of said inner and planar surfaces being embedded in the exterior of the conduit when the nut and collar portion of the element have been threaded a maximum amount whereby to seal the conduit and element against escape of fluid and to lock the conduit and element against separation, and the seal and ferrule being disengaged from the conduit, permitting the latter to be readily removed therefrom when the nut and collar portion of the element have been threaded a minimum amount.

2. A device as defined in claim 1 further including a reinforcing rib on the outer surface of the ferrule.

3. A device as defined in claim 1 wherein the ferrule is of spring steel.

References Cited

UNITED STATES PATENTS

| 2,460,621 | 2/1949 | Courtot | 285—382.7 X |
| 2,547,394 | 4/1951 | Hynes et al. | 285—341 |
| 2,613,086 | 10/1952 | Wolfram | 285—382.7 X |
| 2,738,994 | 3/1956 | Kreidel et al. | 285—382.7 X |

THOMAS F. CALLAGHAN, Primary Examiner

U.S. Cl. X.R.

174—65, 78, 84; 285—54, 348, 382.7